Dec. 8, 1970   F. J. MORSE   3,545,230
FLEXIBLE COOLING DEVICE AND USE THEREOF
Filed Aug. 20, 1968
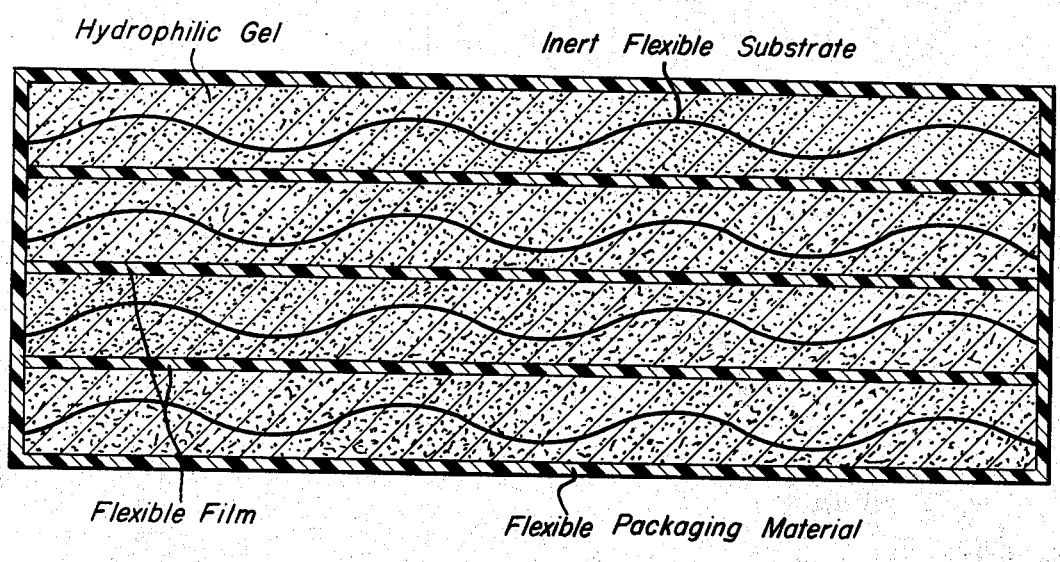
INVENTOR
Frederick J. Morse
BY
ATTORNEY

United States Patent Office 3,545,230
Patented Dec. 8, 1970

3,545,230
FLEXIBLE COOLING DEVICE AND USE THEREOF
Frederick J. Morse, Monroe, N.Y., assignor to Union Carbide Corporation, New York, N.Y., a corporation of New York
Filed Aug. 20, 1968, Ser. No. 753,849
Int. Cl. F25d 3/08
U.S. Cl. 62—530
9 Claims

ABSTRACT OF THE DISCLOSURE

A novel, flexible cooling device comprised of an insoluble hydrophilic gel, which when frozen can be molded to various geometric shapes and retain that particular configuration.

---

This invention relates in general to a novel, flexible cooling device. In one aspect, the invention relates to a device which is easily molded when frozen to various geometric configurations and which may retain that particular shape even after reaching room temperature. In a further aspect, this invention is directed to an article which may be termed flexible "ice."

A wide variety of products are currently available on the market as portable cooling devices. Many conventional cooling media are essentially water or water-alcohol mixtures packaged in sealed rigid metal or plastic containers. They are designed to be frozen in a refrigerator and by utilizing the latent heat of fusion of water, provide the desired cooling. Such devices are well suited for portable coolers, such as insulated picnic baskets, and the like. However, these products are, for the most part, rigid and do not conform to the geometric configuration of the article or articles being cooled. Hence, the cooling obtained will usually be uneven with one portion of the article being greatly cooled or even frozen while another portion will receive little cooling. Particularly in the case of food products and beverages, the uneven cooling may detract from the enjoyment of the product or even cause damage if frozen by direct contact with the cooling device.

Devices for lowering temperature are also widely employed in the treatment of animals and humans. Ice has been employed for many years and is well known for relieving the discomfort of pain and swelling and for injuries suffered accidentaly, in athletics or as a result of other endeavors. However, while the well known ice pack may have a degree of flexibility it requires the crushing of ice, is cumbersome to use and does not provide a uniform cooling surface. Moreover, as the ice or the frozen water-alcohol mixtures attain room temperature, it reverts entirely to the liquid state and provides additional disadvantages in handling, particularly if the enclosing container is not completely leakproof.

Hence, prior to the instant invention there have been no cooling devices that could take advantage of the latent heat of fusion in cooling their surrounding environment when passing from the frozen to the unfrozen state with essentially no free liquid and still maintain flexibility in both states.

It is therefore an object of this invention to provide a novel, flexible cooling device wherein the disadvantages enumerated above are essentially eliminated. A further object of this invention is to provide a flexible cooling device which when frozen can be molded to various geometric shapes and which retains that particular configuration. Another object of this invention is to provide a cooling device which is comprised of essentially non-toxic hydrophilic gels and is therefore suitable for use in human and animal applications. A still further object of this invention is to provide a novel cooling device which can be repeatedly used by merely refreezing. These and other objects will readily become apparent to those skilled in the art in the light of the teachings herein set forth.

In its broad aspect, this invention relates to a novel flexible cooling device and to a process for its use. The novel, cooling device of this invention, which when frozen is flexible, dimensionally stable, and has a relatively high latent heat of fusion, is comprised of at least one reinforced layer of an insoluble, hydrophilic gel which does not become liquid at temperatures below about 35° C. The device is enclosed within a flexible packaging material.

The invention will further be understood by reference to the drawing.

In the drawing, a cross-sectional view is shown of one embodiment of the flexible cooling device of this invention. Layers of reinforced hydrogel separated and encompassed by film are stacked to form a flexible cooling device.

Cooling devices prepared in accordance with the teachings of this invention possess many desirable advantages not available in products currently on the market. The devices, when frozen are pliable, have a cushioning effect and are easily adapted to various geometric configurations. Moreover, unlike, the conventional ice pack or containerized water-alcohol mixtures, the cooling media does not melt to a liquid but remains as a gel which can then be refrozen and used repeatedly. This is a particular advantage since rupture of the outer enclosure will not result in the spillage of significant amounts of liquid.

According to the present invention, a polymer, including copolymers, and a liquid such as water, are combined as an insoluble gel. The gel is usually prepared in the form of a continuous reinforced tape which can then be cut at predetermined intervals, e.g., twelve inches, and if desired piled in multiple layers. The product is then enclosed and sealed in a flexible covering. Since there is essentially no free water present in the finished device, either before or after freezing, the configuration does not change after repeated freeze-thaw cycling. For example, upon melting the material does not flow to the lowest part of the package but maintains its original geometry. Due to the flexible aspect of the cooling device, it can be formed to the shape of the material to be cooled, which in most cases improves heat transfer rates. Moreover, as previously indicated there is no danger of the outer covering rupturing since there is essentially no liquid phase to leak out and alter the environment. A greater advantage is the ability to freeze and re-freeze in the package avoiding time consuming ice crushing and stuffing of conventional ice packs. This material can be manufactured in many different shapes without destroying flexibility so that the physical dimension of the product can be tailored to the requirements of the environment to be cooled.

As hereinbefore indicated, the novel, flexible cooling device of this invention is comprised of at least one reinforced layer of an insoluble hydrophilic gel.

The term "insolubilization" as employed throughout the specification and appended claims is utilized herein to define the formation of a gel which is essentially solid at temperatures below about 35° C. The insolubilization can be effected by a wide variety of methods and includes, but is not limited to, ionizing and nonionizing radiation, and chemical cross-linking through covalent and ionic bonding.

In practice a wide variety of hydrophilic gels can be employed in the preparation of the cooling device of this invention. The only requirements of the particular gel chosen is that it be capable of retaining relatively large quantities of a liquid which can easily be transformed from the liquid to solid state by simple cooling procedures. If the liquid does not enter the solid state then it is impossible to take advantage of the latent heat of fusion. Although numerous liquids can be employed, water is preferred in order to take advantage of the large heat of fusion (144 B.t.u. per pound). Water can be employed as the sole liquid, other liquids such as alcohols can be used, or mixtures of water and other liquids or solutes can be employed.

Illustrative hydrophilic gels which are useful in the cooling device of this invention can be prepared by appropriate techniques from the following starting materials, among others;

Poly(ethylene oxide),
Polyvinyl pyrrolidone,
Polyacrylamide,
Anionic polyacrylamide,
Polyvinylalcohol,
Maleic anhydride-vinylether copolymers,
Polyacrylic acid,
Ethylene-maleic anhydride copolymers,
Polyvinylether,
Dextran,
Gelatin,
Hydroxy propyl cellulose,
Methyl cellulose,
Carboxymethyl cellulose,
Hydroxyethyl-carboxymethyl cellulose
Hydroxyethyl cellulose,
Propyleneglycol alginate,
Sodium alginate,
Polyethyleneimine,
Polyvinyl alkyl pyridinium halides, e.g. polyvinyl-n-butyl-pyridinium bromide,
Polyproline,
Natural starches,
Casein,
Proteins,
Polymethacrylic acid,
Polyvinylsulfonic acid,
Polystyrene sulfonic acid,
Polyvinylamine,
Poly-4-vinylpyridine, polymerized monoesters of olefinic acids, polymerized diesters of olefinic acids, acrylamide and difunctional polymerizable materials, e.g. diacids, diesters or diamides, and the like.

It should be noted that the instant invention is not limited to the use of the starting materials listed above, but includes copolymers of one or more of either the aforementioned compounds or materials similar to these. For example, copolymers of ethylene oxide and minor or major amounts of other alkylene oxides can also be used.

In most instances, the gel need only contain the insoluble swollen polymer and the liquid, e.g., water. If desired however, it can also include other materials to control the physical and chemical properties such as freezing point, chemical stability, color, smell, crystal size and growth rate.

Although a single reinforced layer exhibits optimum conformability to the object being cooled, it is sometimes necessary or desirable to have a greater cooling capacity than can be conveniently obtained in a single layer. This can be achieved by the formation of a multilayer device.

It has been observed that the optimum flexibility and other desirable features are exhibited when the layers of gel are separated from each other by a thin film of an inert material. The frozen layers are then permitted to slide easily over each other and contribute even greater flexibility than that possessed by multilayers of the gel alone.

In practice, gels can be made of any practical thickness, width or length. In one embodiment gels have been prepared as a continuous tape which measures 3 inches wide by one-eighth of an inch thick. Dacron gauzes, both 9 and 20 holes per inch, which can be implanted in the material as it is being insolubilized lend strength to the resulting gel. Before being packaged the gels may be swollen to their maximum liqoud content. The product is then cut into predetermined lengths, stacked, if a multilayer device is desired, and then packaged in a polyethylene bag of the appropriate thickness. Optimum results are obtained when the gel layers have a separator to separate them. This film can be applied during the preparation of the gel. When cooling devices were made with gel without the backing, the result was some loss of flexibility when frozen.

Devices of 20 layers of gel and higher have been made and found to have good flexibility.

The type of separator used to separate the gel layers is not necessarily critical and a wide variety of materials can be utilized. The only requirement of the separators is that they be flexible at reduced temperature and essentially unreactive with the gel. They do not have to be a continuous film but can be perforated. Moreover, the separator can be a material which is applied to the surface of the gel and which effectively prevents adhesion of the layers when stacked—such materials include silicone surfactants, cetyl alcohol and the like. Any of the numerous products currently on the market can be employed with satisfactory results. For example, separators can be composed of polyethylene, polyproylene, polystyrene, polyvinylchloride, polyethylene terephthalate, metal foils, and the like. Similarly, the outer covering or enclosure in which the multilayers of gel are enclosed can be fashioned from commercially available films or other packaging materials.

The flexible cooling device of this invention can be manufactured as a single use, disposable product or as a reusable device. If the device is meant to be disposable the outer enclosure can be a laminate with insulating material, such as cloth, polymer foams, paper and the like, on the outside. The inner portion of the laminatet can be a common plastic such as polyethylene, polypropylene, and the like, to affect sealing or to protect the gel. A metal foil can be part of the laminate to prevent the device from drying out. The primary package can also have attaching devices at each end to provide a means of securing the cooling device to the area to be cooled. Finally, the product can be manufactured and shipped as a sterile item if desired.

As a re-usable cooling device, the outer enclosure can be a common plastic bag sealed around the edges. This unit can be supplied with an auxiliary bag into which the tape is placed. This outer bag would be of a material which has appropriate heat transfer rates and may have strings atached at both ends to be used to secure the tape to the area to be cooled. Both types of product can be packaged as a unitized structure for example, quilt like in character. Appropriate performations can be inserted so that the device can be divided into smaller pieces.

In one preferred aspect, the novel cooling devices of this invention are comprised of a hydrophilic, polymeric gel of at least one insolublized polymer of the formula:

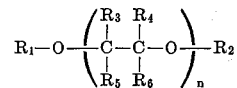

wherein $R_1$ and $R_2$ are selected from the group consisting of hydrogen, alkyl radicals and alkyl substituted aryl radicals, and wherein $R_3$ is hydrogen when $R_4$ is selected from the group consisting of hydrogen, methyl, phenyl and vinyl radicals, $R_4$ is hydrogen when $R_3$ is selected from the group consisting of hydrogen, methyl, phenyl and vinyl radicals, $R_5$ is hydrogen when $R_6$ is selected from the group consisting of hydrogen, methyl, phenyl and vinyl radicals, and $R_6$ is hydrogen when $R_5$ is selected from the group consisting of hydrogen, methyl, phenyl and vinyl radicals, and $n$ is greater than one.

These hydrophilic gels are polymeric compounds containing at least one of the structural units shown below:

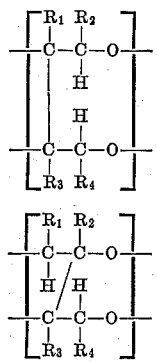

wherein $R_1$ is hydrogen when $R_2$ is selected from the group consisting of hydrogen, methyl, phenyl and vinyl radicals; $R_2$ is hydrogen when $R_1$ is selected from the group consisting of hydrogen, methyl, phenyl and vinyl radicals; $R_3$ is hydrogen when $R_4$ is selected from the group consisting of hydrogen, methyl, phenyl and vinyl radicals; and wherein $R_4$ is hydrogen when $R_3$ is selected from the group consisting of hydrogen, methyl, phenyl and vinyl radicals.

These hydrophilic polymeric gel compounds may include carbon to carbon cross-linking between straight chain carbon atoms and the carbon atoms of branch chain methyl groups and between the carbon atoms of branch chain methyl groups themselves. In addition a very minor and insignificant number of bonds may include two oxygen atoms linking the carbon atoms.

The polymeric gel compounds may contain cross-linking bonds present as inter-molecular bonds (e.g. between two different molecules) and intramolecular bonds (e.g. between carbon atoms of the same molecule), and combinations of intra and intermolecular cross-linking bonds.

The process for producing these polymeric gels from poly-(ethylene oxide) comprises preparing a homogeneous water solution of at least one of the water soluble compounds selected from the following class of compounds:

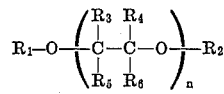

wherein $R_1$ and $R_2$ are selected from the group consisting of hydrogen, alkyl radicals and alkyl substituted aryl radicals, $R_3$ is hydrogen when $R_4$ is selected from the group consisting of hydrogen, methyl, phenyl, and vinyl radicals, $R_4$ is hydrogen when $R_3$ is selected from the group consisting of hydrogen, methyl, phenyl and vinyl radicals, $R_5$ is hydrogen when $R_6$ is selected from the group consisting of hydrogen, methyl, phenyl and vinyl radicals, $R_6$ is hydrogen when $R_5$ is selected from the group consisting of hydrogen, methyl, phenyl and vinyl radicals, and $n$ is greater than one; submitting the solution to ionizing radiation for a period of time sufficient to cause insolubilization of the polymer.

The pH of the solution apparently is not critical to the operability of the preparation of the polymeric gels although the time required to cause formation of the gel-like material can be considerably shortened by utilizing a starting solution having a pH of about 7.0.

Temperature apparently is not critical to the operability of the process since the gel-like material has been formed in solutions having a temperature of just above the freezing point up to the boiling point of the starting solution.

In the treatment of polymers of ethylene oxide in accordance with the present process it is preferred to utilize poly(ethylene oxide) having a molecular weight ranging from about $1 \times 10^5$ to about $10^8$; a starting water solution containing at least about 0.2 weight percent of poly(ethylene oxide); and submitting the starting solution to a total irradiation dosage of at least about $52.0 \times 10^4$ rads to produce the gel-like material.

Table I is a tabulation of the results obtained by irradiating polymers of ethylene oxide of various molecular weights under varying conditions, as noted, to produce a final gel-like material.

TABLE I

| | Molecular weight | Conc., wt. percent | Atmosphere | Type of radiation | Dosage in rads | Wt. percent $H_2O$ in the gel-like material | Viscosity in centipoises |
|---|---|---|---|---|---|---|---|
| (1) | $3.0 \times 10^6$ | 2 | Air | X-ray | | 98 | Gel. |
| (2) | $3.0 \times 10^6$ | 2.6 | $N_2$ | do | $0.1 \times 10^6$ | 97.4 | Gel. |
| (3) | $3.0 \times 10^6$ | 2.6 | $N_2$ | do | $2 \times 10^6$ | 98 | Gel. |
| (4) | $3.0 \times 10^6$ | 2.0 | Air | $\gamma$ | $1.6 \times 10^6$ | 98 | Gel. |
| (5) | $3.0 \times 10^5$ | 2.5 | Air | $\gamma$ | $1.9 \times 10^6$ | 96.5 | Gel. |
| (6) | $3.0 \times 10^6$ | 2.0 | Air | $\gamma$ | $0.5 \times 10^5$ | 97.5 | Gel. |
| (7) | $3.0 \times 10^6$ | 0.5 | Air | X-ray | $0.3 \times 10^6$ | 99 | Gel. |
| (8) | $3.0 \times 10^5$ | 3.0 | Air | do | $1 \times 10^6$ | 98 | Gel. |
| (9) | $3.0 \times 10^5$–$3.0 \times 10^6$ | 0.5 | Air | do | $3 \times 10^6$ | 99 | Gel. |
| (10) | $3.0 \times 10^6$ | 2.0 | Air | e– | $0.67 \times 10^6$ | 98 | Gel. |

In general, after the hydrophilic polymeric gels have been prepared, they can be used directly or further modified by the addition of or the incorporation of various agents, or other additives, as hereinafter indicated.

In addition to the use of an inert material as a separator in the cooling device of this invention, the device itself can contain various strengthening materials throughout. For example, nylon gauze, rayon mesh, dacron, cellulose or other textile products mesh can be embedded in the hydrophilic gel, or fibers can be embedded in a random orientation.

In practice, the hydrophilic gel forming step employed in the preparation of the polymeric gels can be accomplished prior to, or simultaneously with the placement of the inert separators and/or the incorporation of an internal substrate or strengthening agent. An internal substrate can be incorporated by dipping a matrix prior to insolubilization into the aqueous poly(ethylene oxide) solution and then exposing it to insolubilizing conditions. Other methods for placement of the substrate will readily become apparent to those skilled in the art.

The novel cooling devices of this invention can be made in a variety of thicknesses ranging from one reinforced layer of 1 millimeter thickness or less, to 20 or more layers to give a total thickness of several inches, or more.

The novel cooling devices of this invention can be conveniently sterilized by known techniques. For instance, the device can be sterilized by autoclaving, by irradiation, or other techniques.

EXAMPLE I

A cooling device was prepared by cross-linking a poly-(ethylene-oxide)-water solution and forming the resulting gel into a multilayer device. The poly(ethylene oxide) employed was coagulant grade, blend No. 3718 supplied by the Chemicals Division of Union Carbide Corporation. A four weight percent solution was prepared.

A nylon mesh 3 inches wide and several feet long was coated with this 4 percent solution joined with Mylar backing 4 inches wide and exposed to irradiation and the desired hydrophilic gel obtained. The gel layers was approximately 3 millimeters thick. Several multilayer devices containing from 2 to 20 layers were formed by cutting the gel strip at intervals and placing one layer upon another with the Mylar film between layers. The layered gel was then enclosed within polyethylene of approximate 1.5 mil. thickness. The cooling device was then placed in the freezing compartment of a refrigerator until thoroughly frozen. Upon its removal, the flat multi-layered device was easily deformed to numerous geometric configurations and provided cooling to its environment.

Although the invention has been illustrated by the foregoing examples, it is not to be construed as being limited to the materials employed therein, but rather the invention encompasses the generic area as hereinbefore disclosed. Various modifications and embodiments of this invention can be had without departing from the spirit and scope thereof.

What is claimed is:
1. A flexible cooling device comprised of in combination;
    (1) at least one layer of an insoluble hydrophilic gel, said layer being reinforced by an inert flexible substrate, and
    (2) a flexible packaging material encompassing and sealing said gel, said device, when in the frozen state, being easily moldable into various configurations without loss of dimensional stability, and when in the unfrozen state, the gel contained in said devide does not flow.
2. The cooling device of claim 1 wherein said layers are reinforced with an inert, flexible substrate selected from the group consisting of random fibers, expanded mesh, webbing or woven and non-woven materials.
3. The cooling device of claim 2 wherein said flexible substrate is selected from the group consisting of polyesters, polyethylene or flexible cellulose.
4. The cooling device of claim 1 comprised of more than one layer of said insoluble hydrophilic gel, wherein said layers are separated from each other by an inert, flexible film.
5. The cooling device of claim 4 wherein all of said layers are sealed in a metal foil.
6. The cooling device of claim 1 wherein said insoluble hydrophilic gel is selected from the group consisting of insolubilized
    (1) poly(ethylene oxide), poly(vinylpyrrolidone), polyacrylamide, anionic polyacrylamide, polyacrylic acid, polymethacrylic acid, polyvinylsulfonic acid, polystyrene sulfonic acid, polyvinylamine, polyvinylether, polyvinylalcohol, poly-4-vinylpyridine, polyethylenemine, polyvinyl-n-alkylpyridinium halide, polyproline, methyl cellulose, carboxymethyl cellulose, hydroxyethyl cellulose, hydroxyethylcarboxymethyl cellulose, hydroxypropyl cellulose, sodium alginate, propyleneglycol alginate, gelatin dextran natural starches, casein, proteins, polymerized monoesters of olefinic acids, polymerized diesters of olefinic acids, copolymers of acrylamide and diacids, copolymers of acrylamide and diesters, copolymers of acrylamide and diamides, copolymers of maleic anhydride and vinylethers, and copolymers of maleic anhydride and ethylene,
    (2) copolymers prepared by the copolymerization of two or more of the monomers used in the preparation of the polymers of (1), and
    (3) copolymers prepared by cross-linking two or more of the polymers of (1).
7. The cooling device of claim 1 wherein said hydrophilic gel is insolubilized poly(ethylene oxide).
8. The cooling device of claim 7 wherein poly(ethylene oxide) is insolubilized by cross-linking an aqueous solution of poly(ethylene oxide).
9. The cooling device of claim 8, wherein said poly(ethylene oxide) is present in said solution in an amount of from about 0.2 to about 4 weight percent.

References Cited
UNITED STATES PATENTS

| | | | |
|---|---|---|---|
| 1,586,546 | 6/1926 | Wyeth | 62—530X |
| 2,120,013 | 6/1938 | Bates | 62—530 |
| 2,366,989 | 1/1945 | Robertson | 62—530 |
| 2,595,328 | 5/1952 | Bowen | 62—530 |
| 2,697,424 | 12/1954 | Hanna | 62—530X |
| 2,803,115 | 8/1957 | Shepherd | 62—530 |

WILLIAM J. WYE, Primary Examiner

U.S. Cl. X.R.

126—263; 165—46; 252—67